United States Patent [19]

Tarpill

[11] Patent Number: 5,956,852
[45] Date of Patent: Sep. 28, 1999

[54] CABLE STRIPPING TOOL FOR REMOVING INSULATION FROM RIBBED CABLE

[75] Inventor: Andrew J. Tarpill, East Haddam, Conn.

[73] Assignee: Capewell Components Company, Cromwell, Conn.

[21] Appl. No.: 08/854,560

[22] Filed: May 12, 1997

[51] Int. Cl.⁶ .................................................. H02G 1/12
[52] U.S. Cl. ............................................ 30/90.3; 30/90.1
[58] Field of Search .................................. 30/90.1, 90.2, 30/90.3; 81/9.44, 9.41

[56] References Cited

U.S. PATENT DOCUMENTS

| | | | |
|---|---|---|---|
| D. 235,506 | 6/1975 | Matthews | D8/98 |
| D. 270,992 | 10/1983 | Matthews | D8/98 |
| D. 297,910 | 10/1988 | Matthews | D8/98 |
| 980,600 | 1/1911 | Church | 30/90.2 |
| 2,683,930 | 7/1954 | Walters | 30/90.3 |
| 3,377,891 | 4/1968 | Horrocks | 30/90.1 |
| 3,398,610 | 8/1968 | Mathews | 30/90.1 |
| 3,433,106 | 3/1969 | Matthews | 81/9.41 |
| 3,535,785 | 10/1970 | Matthews | 30/90.7 |
| 3,566,466 | 3/1971 | Matthews | 30/90.1 |
| 3,572,189 | 3/1971 | Matthews | 30/90.1 |
| 3,659,483 | 5/1972 | Matthews | 30/90.1 |
| 3,820,420 | 6/1974 | Matthews | 30/91.2 |
| 3,990,331 | 11/1976 | Matthews | 30/90.1 |
| 4,028,800 | 6/1977 | Matthews | 30/90.1 |
| 4,203,333 | 5/1980 | Campari | 81/9.44 |
| 4,559,704 | 12/1985 | Michael, III | 30/90.1 |
| 4,738,027 | 4/1988 | Bermier, Jr. et al. | 30/90.6 |
| 5,561,903 | 10/1996 | Bourbeau | 30/90.4 |
| 5,745,943 | 5/1998 | Bagley | 30/90.6 |

FOREIGN PATENT DOCUMENTS 2147151  5/1985  United Kingdom ............... 30/90.1

*Primary Examiner*—Hwei-Siu Payer
*Attorney, Agent, or Firm*—DeLio & Peterson, LLC

[57] ABSTRACT

A cable stripping tool for removing insulation from cable having a noncircular cross-section, particularly cable having ice breaking ribs, includes a body with a longitudinal opening for receiving the cable and an adapter having a longitudinal opening specially shaped to receive the cable and to hold the longitudinal axis of the cable aligned relative to the longitudinal axis of the body. A cutting blade is secured to the body and projects inwards relative to the aligned longitudinal axis of the cable and the body. The cutting blade cuts the outer layer of insulation from the cable when the body of the tool is rotated relative to the cable. The adapter remains fixed relative to the cable and provides a smooth cylindrical outer guide surface around which the tool rotates.

16 Claims, 3 Drawing Sheets

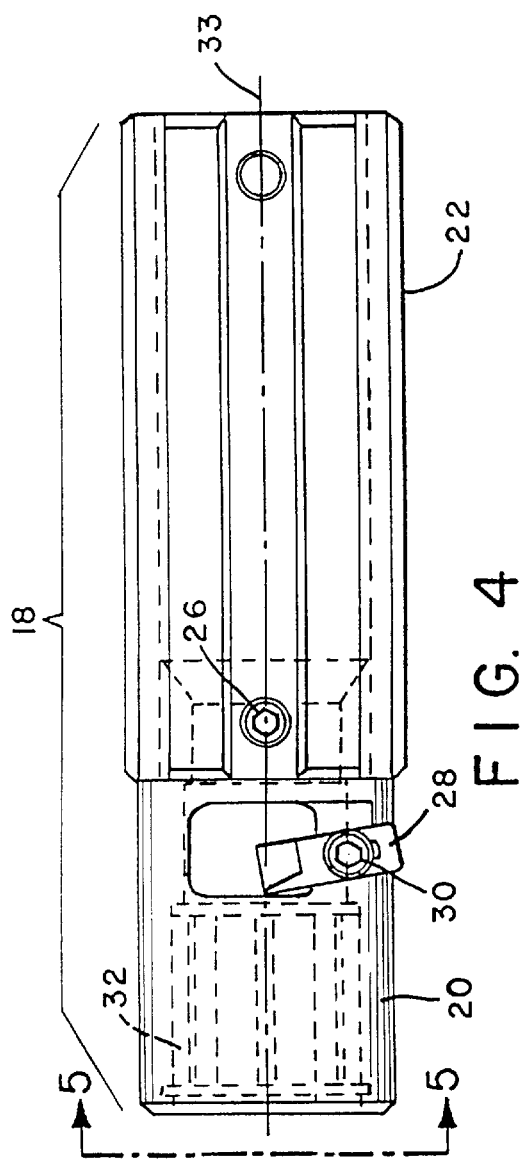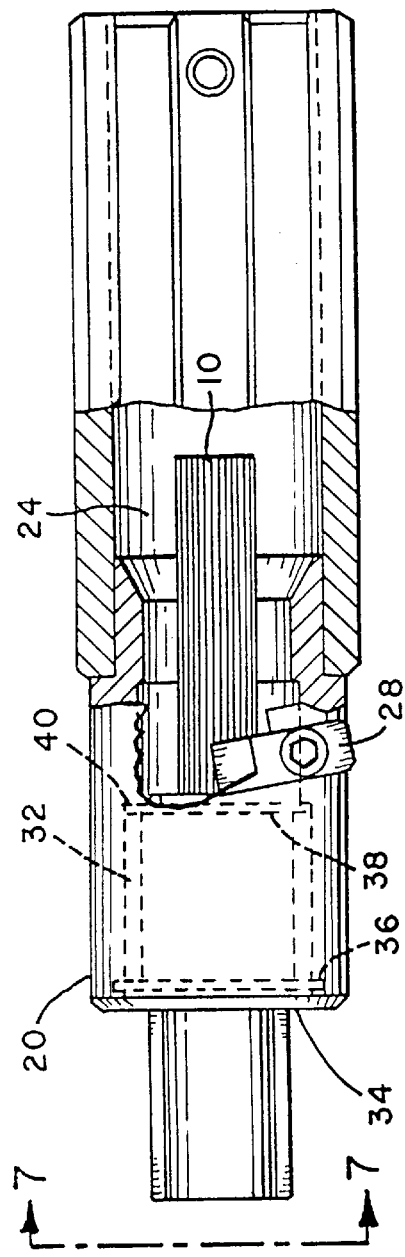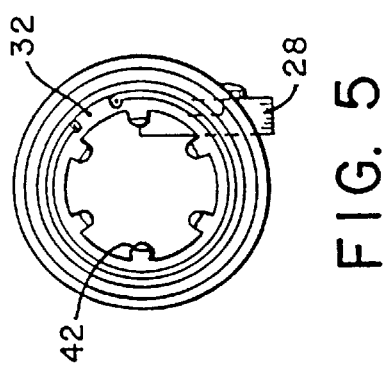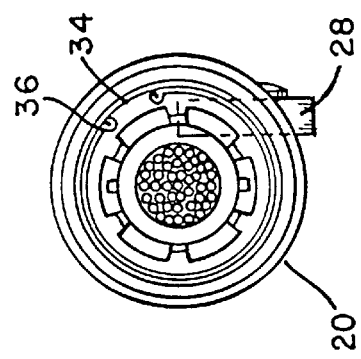

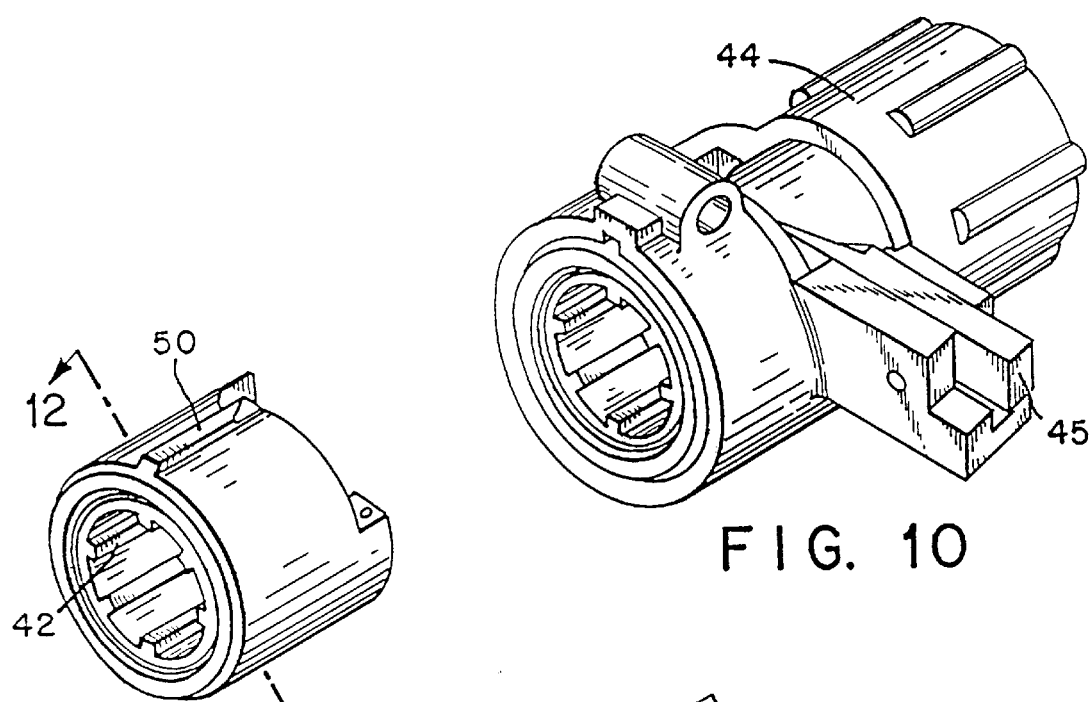
FIG. 10
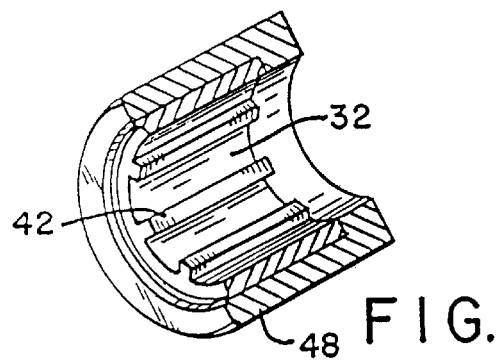
FIG. 11
FIG. 12
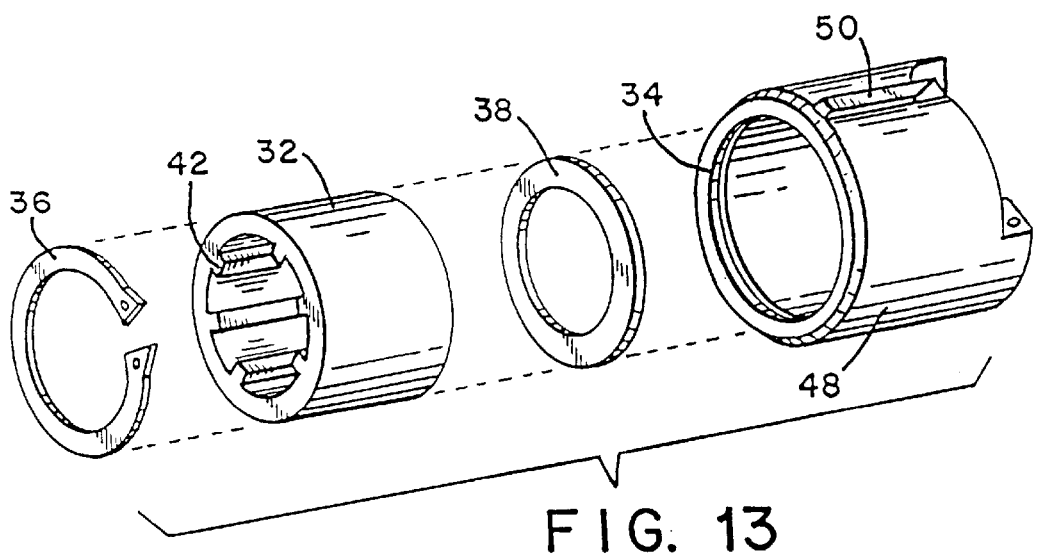
FIG. 13

CABLE STRIPPING TOOL FOR REMOVING INSULATION FROM RIBBED CABLE

BACKGROUND OF THE INVENTION

1. Field of the Invention

The present invention generally relates to tools for removing insulation from cable. More particularly, the invention relates to tools for quickly and effectively removing insulation from cable having a noncircular cross section, such as power transmission cable having ice breaking ribs molded along the exterior of the cable.

2. Description of Related Art

Electrical cable is typically constructed with an electrically conductive core and an outer layer of insulation which must be removed from the ends in order to connect the cable for use. Tools for accomplishing this job, particularly tools used in the electrical power generation and transmission industry, are referred to as "cable strippers". Although cable strippers vary in design, the tools most commonly used in this industry are handheld tools having a body with a longitudinal cable receiving opening passing through them. A blade is mounted on the body of the tool and projects into the cable receiving opening sufficiently far to cut the insulation from the cable as the body is rotated relative to the cable.

Examples of this basic type of tool include the tools shown in U.S. Pat. No. 3,398,610 issued on May 15, 1967, U.S. Pat. No. 3,433,106 issued on Mar. 18, 1969, U.S. Pat. No. 3,572,189 issued on Nov. 26, 1968 and U.S. Pat. No. DES 297,910 issued on Oct. 4, 1988.

Although these tools differ in features and construction, they share the characteristic that they are all designed for use only on cables that have a circular cross section. In each of these designs, the rotational axis of the tool and the center of the cable are maintained in alignment by contact between an alignment portion of the tool and the outer surface of the cable. Thus, in order for these tools to operate properly, the outer surface of the cable must be smooth and cylindrical.

Recently, the power generation and transmission industry has begun to use power transmission cable having one or more ribs projecting outward from the outer surface of the insulation. This type of cable is most commonly used in exposed locations, for example when strung between poles or transmission towers. The ribs are designed to help the cable shed ice during icing conditions.

Cable with ice breaking ribs are expected to become more widely used, and cable with other noncircular cross sectional shapes are also being investigated for their ice breaking properties. Also, cable having ribs or other noncircular cross sectional shapes may be used in underground locations for identification purposes.

Cable stripping tools of the type presently in use cannot strip the insulation from cables having ribs or noncircular cross sections because the outer surface of the insulation cannot be used for maintaining the alignment needed by the tool. When a prior art tool is used, the alignment portion of the tool bumps up and over the ribs and the rotational axis of the cable stripper does not remain in alignment with the axis of the cable as it is rotated. This misalignment may simply result in a poor stripping job, making it difficult to remove the insulation completely, or the stripping blade may actually damage the inner conductor.

Bearing in mind the problems and deficiencies of the prior art, it is therefore an object of the present invention to provide a cable stripping tool for removing insulation cleanly and effectively from cable having a noncircular cross section.

It is another object of the present invention to provide a cable stripping tool which can strip the insulation from cable having different numbers of ice breaking ribs without damaging the inner conductor.

A further object of the invention is to provide a cable stripping tool which may be easily reconfigured to strip insulation from cable having various different cross sectional shapes.

Still other objects and advantages of the invention will in part be obvious and will in part be apparent from the specification.

SUMMARY OF THE INVENTION

The above and other objects and advantages, which will be apparent to one of skill in the art, are achieved in the present invention which provides a tool for stripping the outer layer from around the core of a cable having a noncircular cross section. The tool comprises a body formed with an opening therein oriented along the longitudinal axis of the body. The opening has a diameter at least sufficient to accommodate the core of the cable to be stripped. An adapter for the cable is rotatably secured to the body of the tool such that the body may be rotated relative to the adapter while the adapter remains fixed relative to the cable. The adapter has a longitudinal opening specially shaped to receive the cable and to hold the longitudinal axis of the cable aligned relative to the longitudinal axis of the body. A cutting blade is secured to the body and projects inwards relative to the aligned longitudinal axis of the cable and the body.

In the preferred embodiment, the longitudinal opening in the adapter has a plurality of inward projections, each of which contacts the outer surface of the insulating layer on the cable. The outer surface of the adapter is cylindrical and this forms a guide surface around which the body rotates. The longitudinal axis of the adapter is constantly held in alignment with the longitudinal axis of the cable by the contact between the inward projections and the outer surface of the cable.

Although the longitudinal opening in the adapter may be constructed to exactly match the cross sectional shape of the cable, the preferred design is to construct this longitudinal opening with a cross sectional shape which allows a variety of different cables having different numbers and arrangements of longitudinal ice breaking ribs to fit within its interior. The most highly preferred design has six (6) inward projections equally spaced around the interior of the longitudinal opening in the adapter.

In one aspect of the invention, the adapter is mounted directly in an adapter receiving opening at one end of the body. However, in the preferred embodiment of the invention described below, the body comprises an outer bushing and a handle with the adapter being secured within an adapter receiving opening located inside the outer bushing. In this embodiment the outer bushing with the adapter is removable from the handle. The blade may be mounted on either the handle or the outer bushing. The outer bushing may be removed from the handle to conveniently change the adapter for use with different diameter cables.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

FIG. 4 is a side elevational view of a first embodiment of a tool constructed according to the present invention.

FIG. 5 is an end elevational view looking inward along the longitudinal axis of the tool as indicated by line 5—5 in FIG. 4.

FIG. 6 shows a side elevational view, partly in cross section, of the tool in FIG. 4 with a cable of the type seen in FIG. 1 partially inserted into the tool and with a portion of the insulation having been stripped off.

FIG. 7 is an end elevational view of the tool and cable looking inward along the longitudinal axis of the tool as indicated by line 7—7 seen in FIG. 6.

FIG. 10 is a perspective view of a second embodiment of the invention.

FIG. 11 is a perspective view of an outer bushing used in the embodiment of the invention seen in FIG. 10.

FIG. 12 is a cross sectional view of the outer bushing taken along the line 12—12 in FIG. 11.

FIG. 13 is an exploded view in perspective of the outer bushing and adapter seen in FIG. 11.

DESCRIPTION OF THE PREFERRED EMBODIMENT(S)

Figure 1:
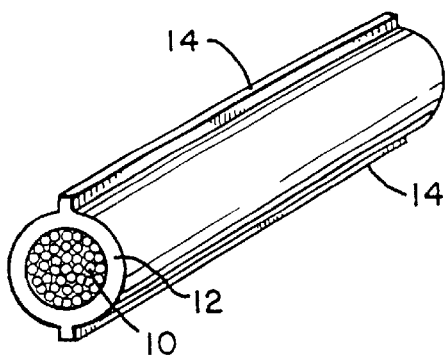
FIG. 1 is a prior art view of cable to be stripped having two longitudinal ice breaking ribs.

In describing the preferred embodiment of the present invention, reference will be made herein to FIGS. 1–13 of the drawings in which like numerals refer to like features of the invention. Features of the invention are not necessarily shown to scale in the drawings.

Figure 3:
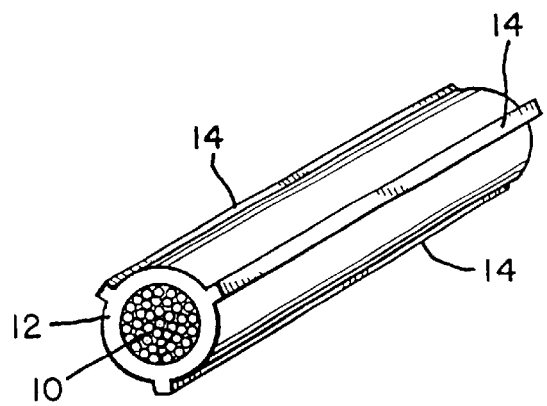
FIG. 3 shows a similar cable to that shown in FIG. 1, except that the cable has three longitudinal ice breaking ribs.
Figure 2:
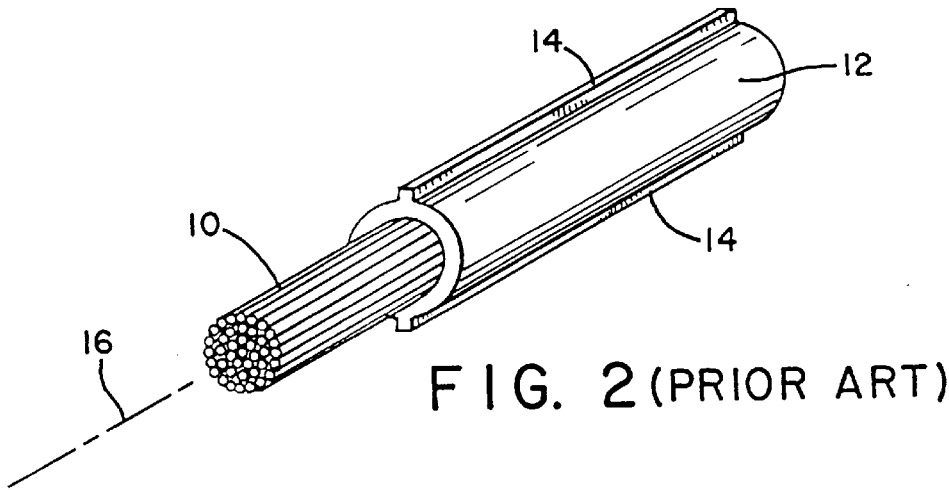
FIG. 2 shows the prior art cable of FIG. 1 after the insulation has been stripped from one end.

Referring to FIGS. 1, 2 and 3, two types of cable which may be used for power transmission are seen. Each cable comprises an inner core 10 covered by an outer insulating layer 12. The outer surface of each type of cable is noncircular in cross section. In the cable seen in FIGS. 1 and 2, the outer surface includes two longitudinal ice breaking ribs 14. The cable seen in FIG. 3 includes three such longitudinal ice breaking ribs. For reference, the longitudinal axis of the cable has been identified with reference numeral 16.

FIG. 2 illustrates the cable of FIG. 1 after a portion of the insulation has been stripped using the tool of the present invention.

While the present design is particularly effective for use on cables having longitudinal ice breaking ribs, the design may also be modified to strip the insulation from other types of cable having a noncircular outer cross section, provided that the core 10 of the cable has an approximately circular cross section. For example, cable having a square cross section or a triangular cross section may be stripped.

Referring to FIG. 4, the cable stripper of the present invention includes a body 18. The body may be formed as a single piece. However, in the preferred design shown in FIG. 4, it comprises an outer bushing 20 removably mounted to a handle 22. An opening 24 extends longitudinally along the axis of the body (see the partially cut away view of FIG. 6). Preferably, this opening has a diameter sufficient to accept the maximum diameter of the cable. However, in the handle region it only needs to be sufficiently large to accept the stripped core 10.

It is also preferred to have this longitudinal opening 24 extend along the entire lengthwise axis of the body. However, in some applications, it may be preferred to restrict the depth of this opening in the handle portion to act as a stop and limit the distance that insulation is stripped from the end of the cable. This stop function may also be performed by separately mounting a stop ring (not shown) to the exterior of the cable which abuts the end of the tool when sufficient insulation has been removed The outer bushing 20 is held to the handle 22 by set screw 26. When set screw 26 is removed, the outer bushing 20 may be removed from the handle. This permits the outer bushing 20 to be easily replaced.

A cutting blade 28 is mounted to the outer bushing 20 with fastening screw 30. The cutting blade 28 projects into the longitudinal opening through the tool to a depth just sufficient to remove the insulation from the cable when the body is rotated relative to the cable. In order for the cutting blade 28 to completely strip the outer layer of insulation 12 without damaging the conductive core 10, the longitudinal axis 16 of the cable must be held in alignment with the longitudinal axis 33 of the tool. This alignment must be continuously maintained as the tool is rotated relative to the cable.

Figure 8:
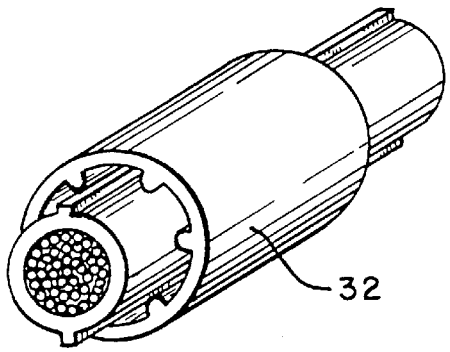
FIG. 8 is a perspective view of the adapter portion of the invention showing the relationship between the outer projections in the adapter and the outer surface of the cable with two ribs seen in FIGS. 1 and 2.
Figure 9:
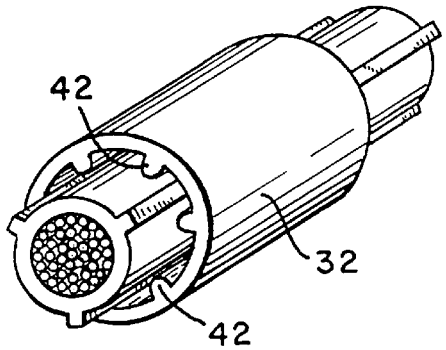
FIG. 9 is a view similar to FIG. 8 showing the same adapter engaging the cable with three ribs seen in FIG. 3.

The necessary alignment is achieved through the use of an adapter 32 seen best in FIGS. 8 and 9. Adapter 32 is rotatably secured within an adapter receiving opening 34 inside the outer bushing 20. The adapter 32 includes a cylindrical outer surface which rotates concentrically with the longitudinal axis 33 of the tool and is held inside the adapter receiving opening 34 by retaining ring 36.

The retaining ring 36 and adapter 32 may be seen in FIGS. 5 and 7. However, the construction will be best understood with reference to FIG. 13 which provides an exploded view of the retaining ring 36, adapter 32 and a similar outer bushing intended for use in a second embodiment of the invention seen in FIG. 10. FIG. 1 3 also illustrates the thrust washer 38 located at the opposite end of the adapter 32 from the retaining ring 36. Thus, the adapter 32 is held in the outer bushing 20 between the retaining ring 36 and the thrust washer 38. The thrust washer 38 sits against a lip 40 which is formed at the end of the adapter receiving opening 34.

To hold the ribbed cable of FIGS. 1–3, the adapter 32 is provided with a plurality of inward projections 42. The inward projections have an inward projection distance which is at least as great and, preferably, greater than the height of the ribs 14 on the cable to be stripped. For cable having two ribs, as seen in FIGS. 1, 2 and 8, it may be sufficient to have two inward projections, particularly, if such projections are sufficiently wide at the contact point with the outer surface of the cable to prevent the cable from shifting to either side. However, in the preferred embodiment, there are at least three and, preferably, six such inward projections. As may be seen in FIG. 9, the six projections may also be used for cable having differing numbers of ice breaking ribs.

It also should be understood that longitudinal openings of different configurations to match the shapes of cable having various other types of noncircular cross sectional shapes may be used. The longitudinal opening may exactly match the cross sectional shape, being just sufficiently larger than the cross sectional shape to allow the cable to pass through the opening or it may be configured for various different cables as has been shown in FIGS. 8 and 9. The essential requirement is that the longitudinal opening in the adapter 32 engage the cable and hold it in concentric alignment with the axis of rotation of the adapter.

FIGS. 10, 11, 12 and 13 show a second embodiment of the tool. In FIG. 10, the body 44 entirely surrounds the outer bushing 48. A locking rib 50 is engaged by the body 44, as may be seen in FIG. 10. In both the embodiments seen in FIG. 4 and in FIG. 10 the adapter may be easily changed by changing the outer bushing holding the adapter. In the embodiment of FIGS. 4–7, changing the outer bushing 20 also changes the blade 28 mounted to the outer bushing. In the embodiment of FIG. 10, however, the blade 45 is not directly mounted to the housing 44, and is separately changed.

FIG. 11 illustrates the outer bushing 48 of the second embodiment as it appears when assembled, but removed from the body 44. FIGS. 12 and 13 show cross sectional views and exploded views of the outer bushing 48, respectively.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A handheld cable stripping tool for stripping cable having a noncircular cross section with a rotary stripping motion, the tool comprising:

a body formed with an opening therein oriented along a longitudinal axis of the body, the opening having a diameter at least sufficient to accommodate a core of cable to be stripped, the cable having a prescribed construction including the core, the core being formed along a longitudinal axis of the cable, and an outer layer located around the core, the outer layer having a noncircular cross section;

an adapter rotatably secured to the body for rotation relative to the longitudinal axis of the body such that the body may be rotated relative to the adapter while the adapter remains fixed relative to the cable to be stripped, the adapter having a longitudinal noncircular opening shaped to receive the noncircular cable and to hold the longitudinal axis of the cable aligned relative to the longitudinal axis of the body, the noncircular opening in the adapter cooperating with the noncircular cross section of the cable to prevent the cable from rotating relative to the adapter; and a cutting blade secured to the body and projecting inwards relative to the aligned longitudinal axes of the cable and the body, the cutting blade cutting the outer layer from the cable when the body is rotated relative to the cable.

2. A cable stripping tool according to claim 1 wherein the longitudinal opening in the adapter has a plurality of inward projections, the inward projections contacting the outer surface of the outer layer to hold the longitudinal axis of the cable to be stripped in alignment with the longitudinal axis of the body.

3. A cable stripping tool according to claim 2 wherein the outer layer of the cable to be stripped has at least one longitudinal rib projecting outwards relative to the longitudinal axis of the cable and the inward projections of the opening in the adapter project inwards a distance at least as great as the outward projection distance of the at least one longitudinal rib.

4. A cable stripping tool according to claim 2 wherein the inward projections of the opening in the adapter are spaced around the interior of the opening to accommodate cables having different configurations of longitudinal ribs, including cables having two longitudinal ribs and cables having three longitudinal ribs.

5. A cable stripping tool according to claim 4 wherein the adapter includes at least three inward projections into the opening in the adapter, the at least three inward projections being approximately equally spaced around the interior of the longitudinal opening in the adapter.

6. A cable stripping tool according to claim 5 wherein the adapter includes six inward projections into the opening in the adapter, the inward projections being equally spaced around the interior of the longitudinal opening in the adapter.

7. A cable stripping tool according to claim 1 wherein the body includes an adapter receiving opening at one end with the adapter located therein, and the adapter has a substantially cylindrical outer surface, the adapter rotating within the adapter receiving opening as the body is rotated relative to the cable.

8. A cable stripping tool according to claim 1 wherein the body comprises an outer bushing and a handle, the outer bushing including an adapter receiving opening with the adapter rotating therein as the body is rotated relative to the cable.

9. A cable stripping tool according to claim 8 wherein the outer bushing includes a lip projecting into the adapter receiving opening at one end thereof, the adapter being held within the adapter receiving opening between the lip and a retaining ring located at an opposite end of the adapter receiving opening from the lip.

10. A cable stripping tool according to claim 9 further including a thrust washer located between the adapter and the lip on the adapter receiving opening.

11. A cable stripping tool according to claim 8 wherein the adapter is secured within the outer bushing and the outer bushing is removable from the handle.

12. A cable stripping tool according to claim 11 wherein the adapter is secured within the outer bushing and the outer bushing is non-rotatably mounted within the handle.

13. A cable stripping tool according to claim 8 wherein the cutting blade is mounted on the handle.

14. A cable stripping tool according to claim 8 wherein the cutting blade is mounted on the outer bushing.

15. A cable stripping tool according to claim 1 wherein the longitudinal opening in the adapter has a noncircular cross section that substantially matches the noncircular cross section of the cable to be stripped.

16. A cable stripping tool according to claim 15 wherein the outer layer of the cable to be stripped has at least one rib longitudinally oriented along its outer surface and the longitudinal opening in the adapter has a corresponding groove to receive the rib.

* * * * *